(12) United States Patent
Friedlander et al.

(10) Patent No.: US 12,104,985 B2
(45) Date of Patent: Oct. 1, 2024

(54) SYSTEM FOR AEROSPACE ACOUSTIC TESTING

(71) Applicant: ACOUSTIC RESEARCH SYSTEMS, LLC, Shepherdstown, WV (US)

(72) Inventors: Eric Friedlander, Santa Monica, CA (US); Jeremiah Leiter, Shepherdstown, WV (US); Edward Kinsella, Cranleigh (GB); Michael Robert Wheeler, Cranleigh (GB)

(73) Assignee: ACOUSTIC RESEARCH SYSTEMS, LLC, Shepherdstown, WV (US)

( * ) Notice: Subject to any disclaimer, the term of this patent is extended or adjusted under 35 U.S.C. 154(b) by 265 days.

(21) Appl. No.: 17/715,501

(22) Filed: Apr. 7, 2022

(65) Prior Publication Data
US 2022/0334025 A1    Oct. 20, 2022

Related U.S. Application Data (60) Provisional application No. 63/224,006, filed on Jul. 21, 2021, provisional application No. 63/176,723, filed on Apr. 19, 2021.

(51) Int. Cl.
*G01M 7/00* (2006.01)
*H04R 1/02* (2006.01)
(Continued)

(52) U.S. Cl.
CPC .............. *G01M 7/00* (2013.01); *H04R 1/025* (2013.01); *H04R 1/26* (2013.01); *H04R 1/30* (2013.01);
(Continued)

(58) Field of Classification Search
CPC ........... G01M 7/00; H04R 1/025; H04R 1/26; H04R 1/30; H04R 3/00; H04R 1/403; H04R 1/406; H04R 2201/401
See application file for complete search history.

(56) References Cited

U.S. PATENT DOCUMENTS

| | | | |
|---|---|---|---|
| 3,104,543 A | * | 9/1963 | Kaminski .............. G01N 29/04 73/571 |
| 6,118,876 A | | 9/2000 | Ruzicka |

(Continued)

FOREIGN PATENT DOCUMENTS

| | | | | |
|---|---|---|---|---|
| CN | 104604258 A | * | 5/2015 | ............... H04R 1/40 |
| CN | 107710785 A | * | 2/2018 | ........... G10K 11/178 |

(Continued)

OTHER PUBLICATIONS

CN-104604258-A, English Translation (Year: 2015).*

(Continued)

*Primary Examiner* — Ryan D Walsh
(74) *Attorney, Agent, or Firm* — BIRCH, STEWART, KOLASCH & BIRCH, LLP (57) ABSTRACT

A modular acoustic system for use to perform acoustic testing on an object across an entire audible spectrum with enhanced efficiency and acoustic capabilities is provided. The acoustic system includes an acoustic device having a housing to store a horn assembly with a plurality of transducers, an amplification and power distribution device with an amplifier electrically coupled to the horn assembly of the acoustic device, and a controller operably connected to the amplification and power distribution device. The controller is designed to transmit a plurality of noise signals over a network to the amplifier of the amplification and power distribution device to enable the plurality of transducers of the acoustic device to generate a plurality of acoustic waves across the entire audible spectrum.

7 Claims, 10 Drawing Sheets

(51) Int. Cl.
*H04R 1/26* (2006.01)
*H04R 1/30* (2006.01)
*H04R 3/00* (2006.01)
*H04R 1/40* (2006.01)

(52) U.S. Cl.
CPC .............. *H04R 3/00* (2013.01); *H04R 1/403* (2013.01); *H04R 1/406* (2013.01); *H04R 2201/401* (2013.01)

(56) References Cited

U.S. PATENT DOCUMENTS

| | | | |
|---|---|---|---|
| 6,668,650 B1 | 12/2003 | Lafleur et al. | |
| 9,109,972 B2 | 8/2015 | Larkin et al. | |
| 9,683,912 B2 | 6/2017 | Larkin et al. | |
| 10,295,434 B2 | 5/2019 | Underwood et al. | |
| 10,317,373 B2 | 6/2019 | Larkin et al. | |
| 11,153,685 B2* | 10/2021 | Toguri | G10L 25/51 |
| 11,368,787 B1* | 6/2022 | Paddock | H04R 1/2873 |
| 2001/0032510 A1* | 10/2001 | Eagen | G01M 7/00 |
| | | | 73/571 |
| 2004/0032957 A1 | 2/2004 | Mansy et al. | |
| 2006/0262941 A1* | 11/2006 | Tanase | H04R 1/403 |
| | | | 381/59 |
| 2015/0358734 A1* | 12/2015 | Butler | H04R 3/12 |
| | | | 381/59 |
| 2022/0078555 A1* | 3/2022 | Nelson | H04R 5/023 |

FOREIGN PATENT DOCUMENTS

| | | | |
|---|---|---|---|
| JP | 3603088 B2 | 12/2004 | |
| JP | 2006303769 A | * 11/2006 | .......... H04R 29/001 |
| JP | 2014-20934 A | 2/2014 | |

OTHER PUBLICATIONS

CN-107710785-A, English Translation (Year: 2018).*
JP-2006303769-A, English Translation (Year: 2006).*
Hyperlink: https://vimeo.com/507794904/b5b6e6cc16. ARS Neutron—Overview & Demonstration; by Acoustic Research Systems; video length 22:07; uploaded Feb. 2, 2021 (Year: 2021).*
International Search Report and Written Opinion of the International Searching Authority for International Application No. PCT/US22/23804, dated Jul. 1, 2022, with PCT Recordation of Search History.
Extended European Search Report for European Application No. 22792201.0, dated Aug. 12, 2024.

* cited by examiner

| Multi-core cable | Purpose on device |
|---|---|
| A | LF driver #1, positive |
| B | LF driver #1, negative |
| C | LF driver #1, positive |
| D | LF driver #1, negative |
| E | LF driver #2, positive |
| F | LF driver #2, negative |
| G | LF driver #2, positive |
| H | LF driver #2, negative |
| I | LF driver #3, positive |
| J | LF driver #3, negative |
| K | LF driver #3, positive |
| L | LF driver #3, negative |
| M | LF driver #4, positive |
| N | LF driver #4, negative |
| O | LF driver #4, positive |
| P | LF driver #4, negative |
| Q | MF array, positive |
| R | MF array, negative |
| S | No connection |
| T | HF array, positive |
| U | HF array, negative |
| V | No connection |
| W | No connection |
| X | No connection |
| Y | No connection |

FIG.5

| Amp Channel | Multi-core Cable | Purpose |
|---|---|---|
| 1  + | A | LF1  + |
| 1  - | B | LF1  - |
| 1  + | C | LF1  + |
| 1  - | D | LF1  - |
| 2  + | E | LF2  + |
| 2  - | F | LF2  - |
| 2  + | G | LF2  + |
| 2  - | H | LF2  - |
| 3  + | I | LF3  + |
| 3  - | J | LF3  - |
| 3  + | K | LF3  + |
| 3  - | L | LF3  - |
| 4  + | M | LF4  + |
| 4  - | N | LF4  - |
| 4  + | O | LF4  + |
| 4  - | P | LF4  - |
| 5  + | Q | MF  + |
| 5  - | R | MF  - |
|  |  |  |
| 6  + | T | HF  + |
| 6  - | U | HF  - |
| 7  + |  |  |
| 7  - |  |  |
| 8  + |  |  |
| 8  - |  |  |

SYSTEM FOR AEROSPACE ACOUSTIC TESTING

CROSS-REFERENCE TO RELATED APPLICATIONS

This non-provisional application claims the benefit under 35 U.S.C. § 119(e) to U.S. Provisional Application No. 63/176,723 filed on Apr. 19, 2021 and U.S. Provisional Application No. 63/224,006 filed on Jul. 21, 2021, all of which are hereby expressly incorporated by reference into the present application.

BACKGROUND OF THE INVENTION

The embodiments herein relate generally to systems for performing acoustic testing of satellites, missiles or other objects in aerospace applications. More specifically, embodiments of the invention are directed to a system for performing aerospace acoustic testing of an object with enhanced efficiency, acoustic capabilities and reduced costs.

Current loudspeaker-based testing systems and direct-field acoustic testing (DFAT) systems provide solutions that generally employ existing technologies and concert sound systems combined together to form semi-functional systems that are only successful if operated at their absolute maximum operating limits. In addition, these systems require the use of complicated and time-consuming assemblies that require many components including line arrays, subwoofers, and/or other electrical components, which result in acoustic and operational inefficiencies. In particular, the use of line arrays is associated with unavoidable irregularities in the sound field that do not satisfy customer needs in aerospace applications. Finally, these acoustic testing solutions are prone to mechanical and thermal failures, which compromise the reliability of these systems.

As such, there is a need in the industry for a system for aerospace acoustic testing that addresses the limitations of the prior art, which provides a simplified solution with reduced costs that effectively performs acoustic testing of an object across an entire audible spectrum with enhanced reliability and acoustic capabilities across a wider power band.

SUMMARY OF THE INVENTION

In certain embodiments of the invention, a modular acoustic system for use to perform acoustic testing on an object across an entire audible spectrum with enhanced efficiency and acoustic capabilities is provided. The acoustic system is configured to perform adjustments in real-time on a plurality of acoustic waves directed at the object. The acoustic system comprises an acoustic device comprising a housing to store a horn assembly with a plurality of transducers configured to generate the plurality of acoustic waves, an amplification and power distribution device comprising an amplifier electrically coupled to the horn assembly of the acoustic device, and a controller operably connected to the amplification and power distribution device, wherein the controller is configured to transmit a plurality of noise signals over a network to the amplifier of the amplification and power distribution device to enable the plurality of transducers of the acoustic device to generate the plurality of acoustic waves.

In certain embodiments of the invention, the controller is configured to adjust the plurality of noise signals transmitted to the amplifier of the amplification and power distribution device based on the plurality of acoustic waves generated by the acoustic device, and the plurality of transducers of the acoustic device is configured to generate the plurality of acoustic waves across an entire audible spectrum to perform acoustic testing on an object.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principles of the invention.

DETAILED DESCRIPTION OF CERTAIN EMBODIMENTS

Figure 1:
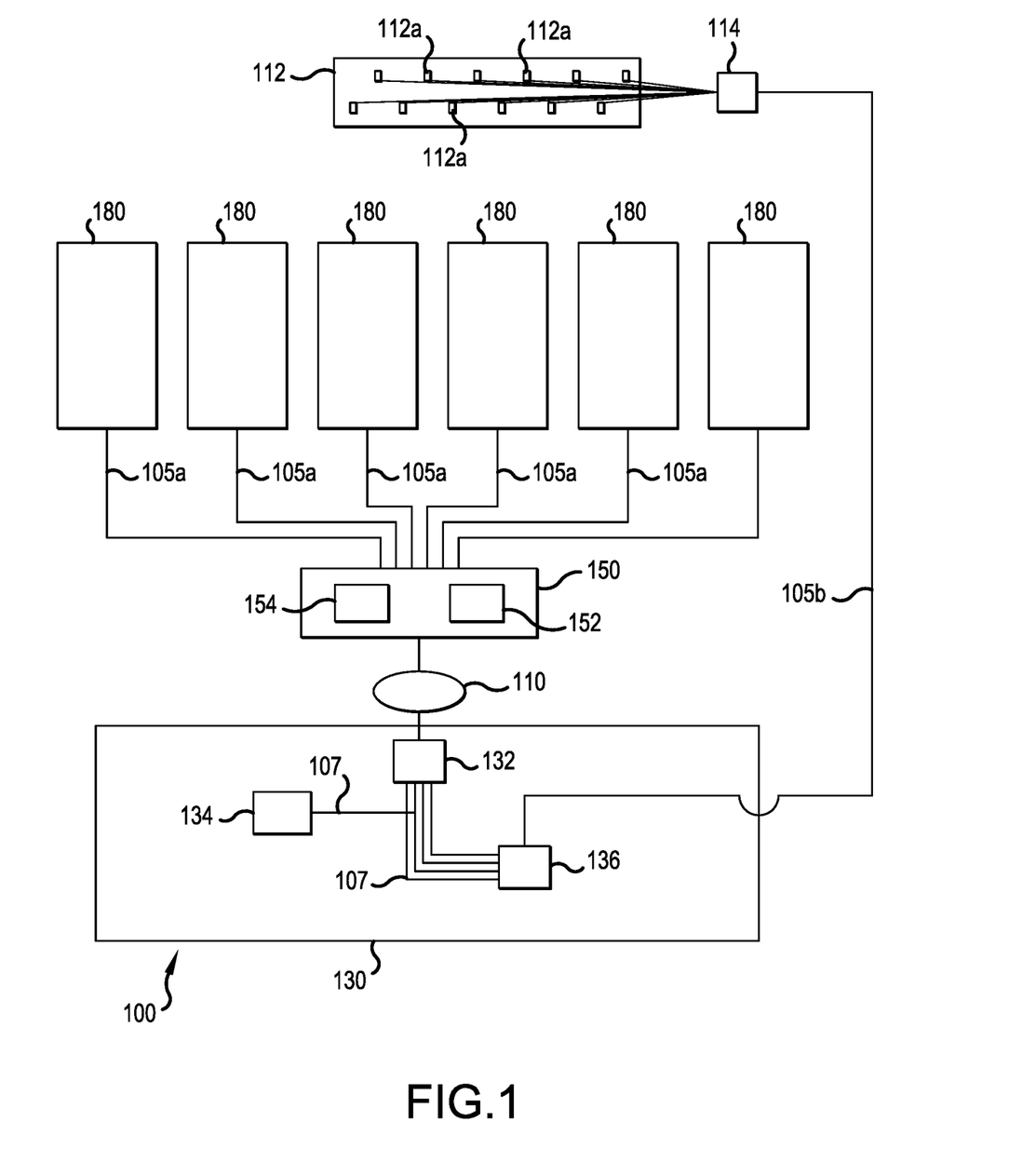
FIG. 1 depicts a schematic view of certain embodiments of a modular acoustic system.

In certain embodiments of the invention as depicted in FIG. 1, modular acoustic system 100 generally comprises a plurality of acoustic devices 180, amplification and power distribution device 150 and drive system 130 operably connected together, which provide an ultra-high output acoustic testing solution that can be used in aerospace applications. In one embodiment, modular acoustic system 100 is used to generate acoustic waves for testing objects including, but not limited to, small satellites, other types of satellites, missiles, and the like. However, it shall be appreciated that modular acoustic system 100 may be beneficial for use to test objects in alternative applications and/or industries in other embodiments of the invention.

In one embodiment of the invention, modular acoustic system 100 comprises acoustic devices 180 connected to amplification and power distribution device 150 by multi-core speaker cables 105*a*, and drive system 130 connected to amplification and power distribution device 150 via network 110.

In this configuration as illustrated in FIG. 1, drive system 130 and amplification and power distribution device 150 control the operation of acoustic devices 180 to generate acoustic waves that are directed to an object for testing purposes. In one embodiment, microphone assembly 112 with an arrangement of any number of microphones 112*a* is provided in the system.

Specifically, modular acoustic system 100 comprises a plurality of microphones 112*a* that are placed in proximity to the one or more acoustic devices 180. This allows microphones 112*a* to capture acoustic waves that are outputted by the one or more acoustic devices 180 and directed to the object to be tested. In one embodiment, microphones 112*a* are connected to patch box 114, which transmits signals from microphones 112*a* through multi-core cable 105*b* to a panel mount connector of drive system 130. As a result, signals from microphones 112*a* pertaining to acoustic waves outputted by the one or more acoustic devices 180 are transmitted to drive system 130. As a result, drive system 130 is configured to make adjustments in real-time to the acoustic waves outputted by the one or more acoustic devices 180 based on the feedback captured by microphones 112*a*.

The details of the above-mentioned components and operation of modular acoustic system 100 will be described in the disclosure that follows.

It shall be appreciated that the number of components and elements of the system shall not be limited based on the figures. For example, it shall be appreciated that modular acoustic system 100 may comprise any number of acoustic devices 180, amplification and power distribution devices 150 and drive systems 130 connected together to achieve certain functional benefits of the overall system.

Figure 2:
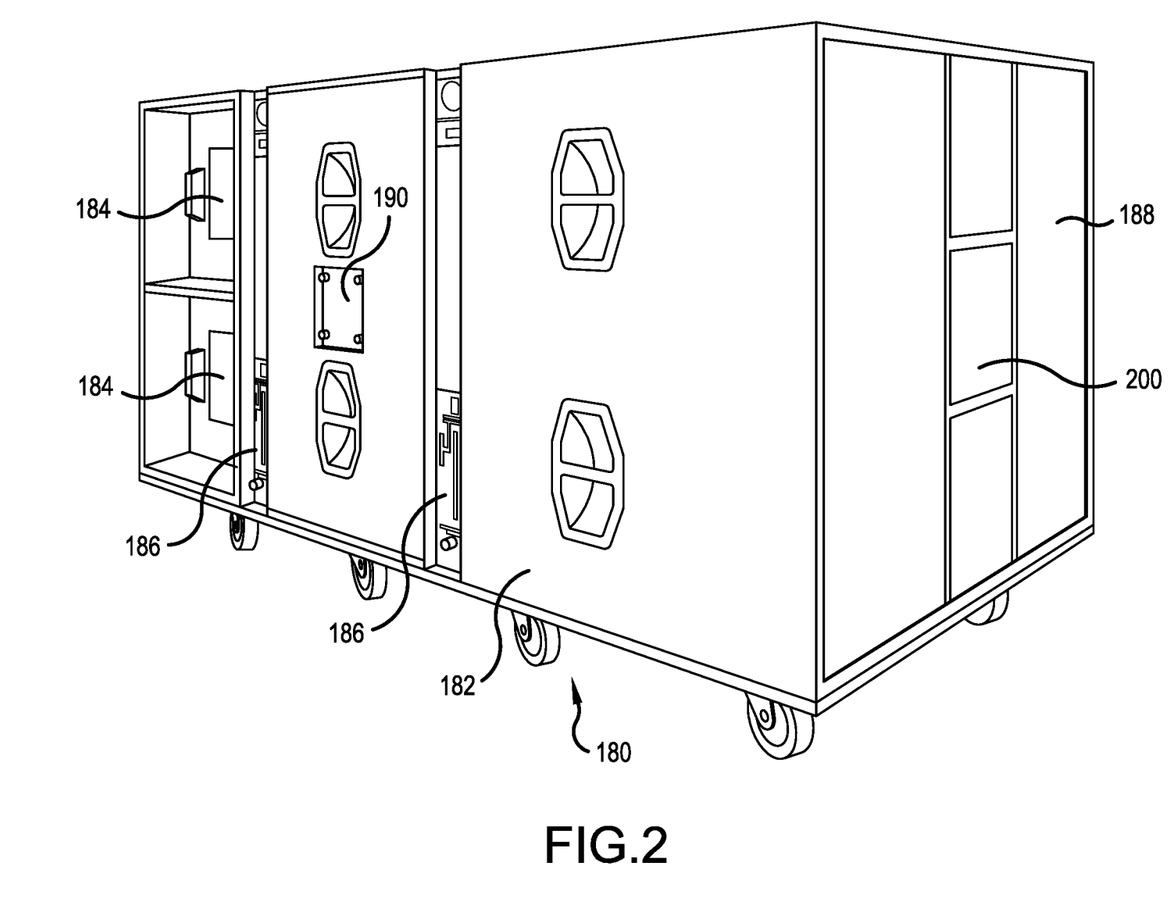
FIG. 2 depicts a perspective view of certain embodiments of the modular acoustic system illustrating acoustic device 180.
Figure 3A:
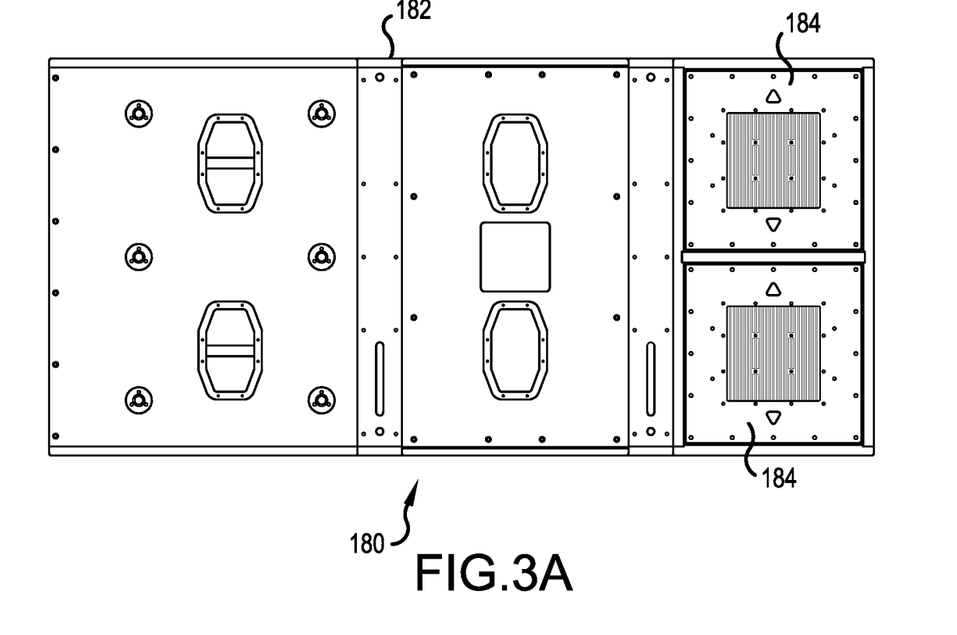
FIG. 3A depicts a side view of certain embodiments of the modular acoustic system illustrating acoustic device 180.
Figure 3B:
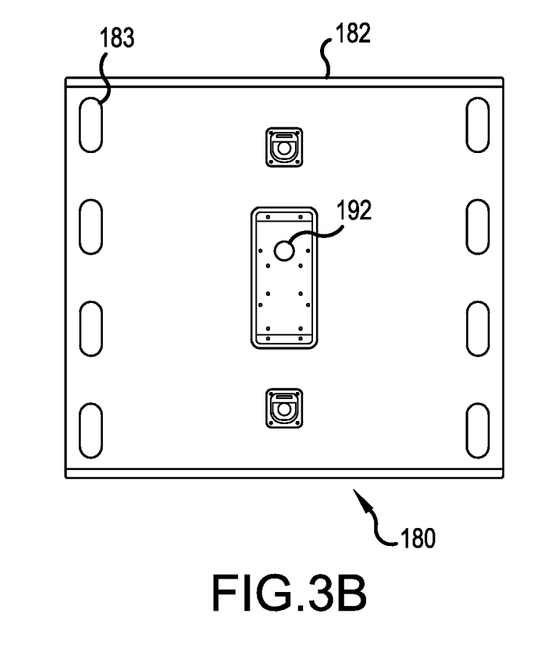
FIG. 3B depicts a rear view of certain embodiments of the modular acoustic system illustrating acoustic device 180.
Figure 4:
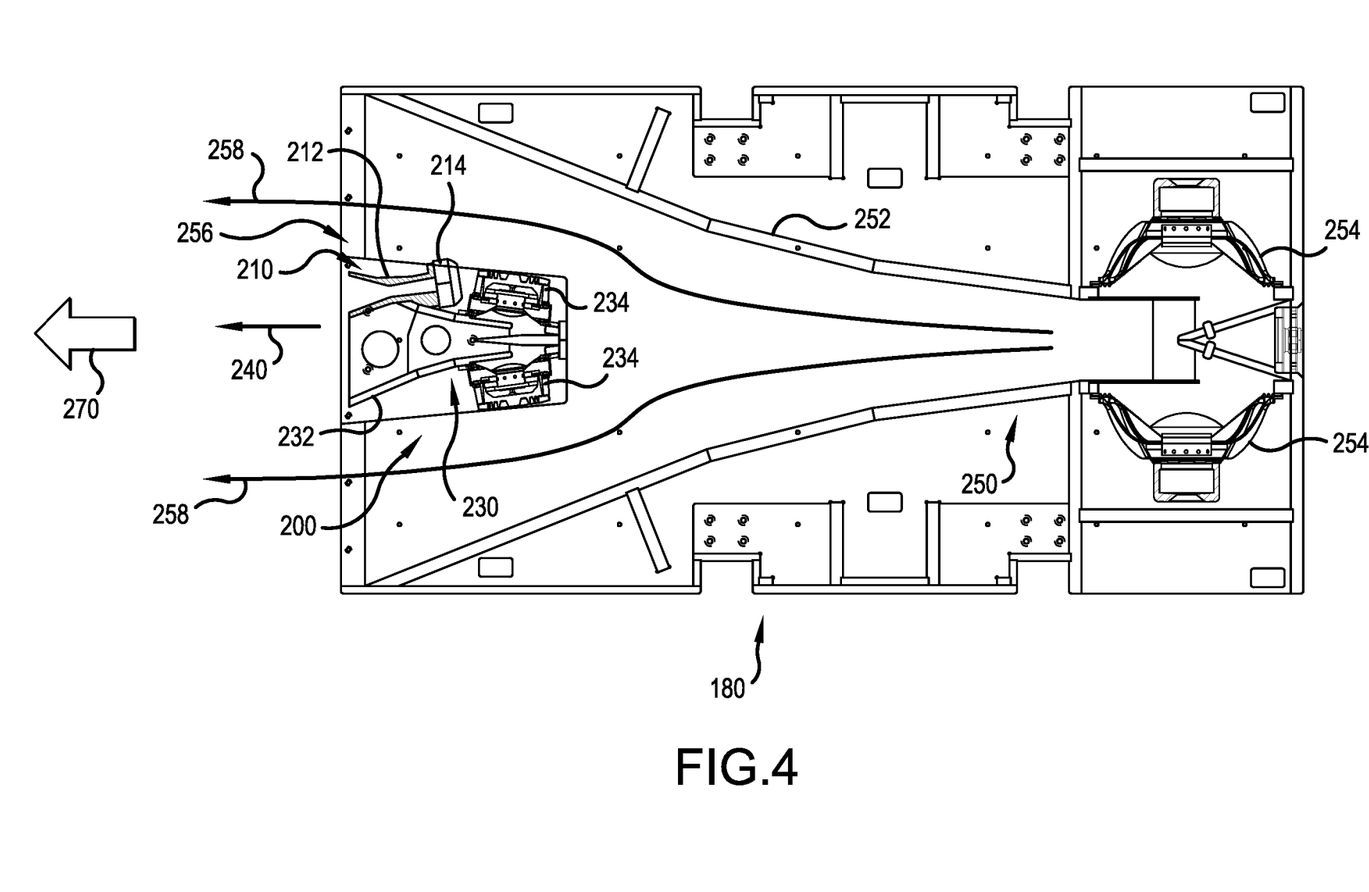
FIG. 4 depicts a cross-sectional view of certain embodiments of the modular acoustic system illustrating interior space of acoustic device 180.

In certain embodiments of the invention as depicted in FIGS. 2-4, each acoustic device 180 serves as a loudspeaker enclosure and generally comprises housing 182 that stores middle frequency/high frequency (MF/HF) horn assembly 200 and low frequency (LF) horn 250, which include any combination and number of acoustic transducers, high-frequency waveguides and associated electrical components/connectors to electrically couple the components together.

In one embodiment as depicted in FIGS. 2 and 3A-3B, acoustic device 180 comprises handles 183 and suspension hardware 186, which allow acoustic device 180 to be easily lifted, maneuvered and/or stacked with other acoustic devices 180 as desired. As shall be appreciated, suspension hardware 186 permits a plurality of acoustic devices 180 to be vertically stacked in an efficient manner for testing larger objects.

In one embodiment of the invention as depicted in FIG. 4, each acoustic device 180 generally comprises LF horn 250 to output low frequency acoustic waves 258 and MF/HF horn assembly 200 to output medium and high frequency (MF/HF) acoustic waves 240. LF horn 250 is disposed within housing 182 of acoustic device 180 and comprises LF horn wall 252 coupled to LF acoustic transducers 254. LF horn wall 252 comprises an end with mouth 256, which outputs low frequency acoustic waves 258.

In one embodiment, each LF acoustic transducer 254 is an approximately 18" woofer. However, the size and specifications of LF acoustic transducer 254 can vary in alternative embodiments. Although FIG. 4 illustrates two LF acoustic transducers 254, it shall be appreciated that any number and arrangement of LF acoustic transducers 254 can be used. In one embodiment, LF horn 250 comprises four LF acoustic transducers 254.

In one embodiment of the invention as depicted in FIG. 4, MF/HF horn assembly 200 is mounted inside mouth 256 of LF horn 250, and comprises a manifold in which middle frequency (MF) horn 230 and high frequency (HF) horn 210 are coupled thereto.

MF horn 230 comprises MF horn wall 232 coupled to MF acoustic transducers 234, which is configured to output medium frequency acoustic waves. In one embodiment, each MF acoustic transducer 234 is an approximately 8" woofer. However, the size and specifications of MF acoustic transducer 234 can vary in alternative embodiments. Although FIG. 4 illustrates two MF acoustic transducers 234, it shall be appreciated that any number and arrangement of MF acoustic transducers 234 can be used. In one embodiment, MF horn 230 comprises ten MF acoustic transducers 234.

HF horn 210 comprises HF horn wall 212 coupled to HF acoustic transducer 214, which is configured to output high frequency acoustic waves. In one embodiment, HF acoustic transducer 214 is an approximately 3" compression driver that is mounted to a waveguide. Although FIG. 4 illustrates one HF acoustic transducer 214, it shall be appreciated that any number and arrangement of HF acoustic transducers 214 can be used. In one embodiment, HF horn 210 comprises eight HF acoustic transducers 214.

In this configuration of MF/HF horn assembly 200, the plurality of HF acoustic transducers 214 of HF horn 210 process a voltage/current signal to generate a plurality of HF acoustic waves that are directed toward the test object. Similarly, the plurality of MF acoustic transducers 234 of MF horn 230 process a voltage/current signal to generate a plurality of MF acoustic waves that are directed toward the test object. As a result, MF/HF horn assembly 200 is configured to output combined MF/HF acoustic waves 240 from the MF/HF horns.

During an operation of acoustic device 180 as depicted in FIG. 4, a LF acoustic output corresponding to LF acoustic waves 258 from LF horn 250 and MF/HF acoustic output corresponding to MF/HF acoustic waves 240 from MF/HF horn assembly 200 are outputted and combined in-phase, which generate a unified and highly enhanced/optimized set of acoustic waves 270 that facilitate the object testing.

As a result, the components of acoustic device 180 are configured to effectively process an input high voltage/current signal to generate a plurality of acoustic waves 270 that are directed toward the test object. In one embodiment, acoustic device 180 is a full-range, phase-coherent, single cabinet acoustic energy source (20 Hz-20 kHz), which can be scaled up in count to meet the size and OASPL requirements of the test to be performed. It shall be appreciated that the specifications of the components of acoustic device 180 can vary depending on the application of modular acoustic system 100.

It shall be appreciated that the specific configuration of MF/HF horn assembly 200, notably the side mounting of the HF and MF horns and careful design of a flare rate of a single horn housing, minimize fatigue failure of the components of the horn housing and allow MF/HF horn assembly 200 to operate under harsh boundary/operating conditions. It shall be appreciated that MF/HF horn assembly 200 is sized to allow for optimal integration of LF horn 250 and other bandpasses as needed in alternative embodiments of the invention. Further, it shall be appreciated that MF/HF horn assembly 200 is modular and can be swapped or updated as needed, depending on the application and user requirements.

In one embodiment of the invention as depicted in FIGS. 2, 3A and 4, acoustic device 180 comprises a thermal management system comprising various heat sink panels 184 that are mounted on the back of LF acoustic transducers 254, and located in visible positions on the exterior of housing 182. Since MF/HF horn assembly 200 is located in the front of acoustic device 180 behind grille 188, HF and MF acoustic transducers 214, 234 are exposed to open air at mouth 256 of LF horn 250. This contrasts the typical sealed enclosure of a loudspeaker in the field.

In this configuration, thermal cooling of acoustic device 180 is improved. Notably, magnetic elements of the acoustic transducers are less likely to overheat and can dissipate thermal buildup more efficiently than existing systems. In addition, the movement of air past the HF/MF acoustic transducers 214, 234 by the action of LF acoustic transducers 254 near the rear end of acoustic device 180 assists in providing a cooling effect on HF/MF acoustic transducers 214, 234.

In one embodiment of the invention as depicted in FIG. 1, each acoustic device 180 is electrically coupled to amplification and power distribution device 150 by multi-core speaker cable 105a. Amplification and power distribution device 150 comprises a plurality of amplifiers 152 connected to power distribution system 154 with real-time network monitoring. In the connection between acoustic device 180 and amplification and power distribution device 150, MF/HF horn assembly 200 is wired to provide amplification for MF horn 230 from a single amplifier channel in amplification and power distribution device 150. Similarly, MF/HF horn assembly 200 is wired to provide amplification for HF horn 210 from a single amplifier channel in amplification and power distribution device 150. However, different configurations could be employed to allow amplification of different portions of the MF and HF bandpasses with different channels from different amplifiers, depending on the application. For example, an alternative embodiment of the invention comprises MF/HF horn assembly 200, which is wired to provide amplification for MF horn 230 from two amplifier channels in amplification and power distribution device 150.

In one embodiment of the invention, amplification and power distribution device 150 comprises six Powersoft X8 amplifiers with each amplifier 152 comprising an 8-channel audio amplifier. In one embodiment, six of the 8-channels of each amplifier 152 are used during the operation of modular acoustic system 100. In an alternative embodiment, seven of the 8-channels of each amplifier 152 are used during the operation of modular acoustic system 100. However, it shall be appreciated that the remaining unused channels can be used in alternative embodiments to accommodate different user requirements.

Mains power for amplifiers 152 is supplied from a LINK power distribution unit of power distribution system 154, which is mounted in amplification and power distribution device 150. The LINK power distribution unit accepts 3-phase, 5-wire mains power via Link PowerLock connectors. Here, the power distro supports 120V or 240V inputs. In other embodiments, it shall be appreciated that power from alternative sources can be supplied to the components of amplification and power distribution device 150.

Figure 5:
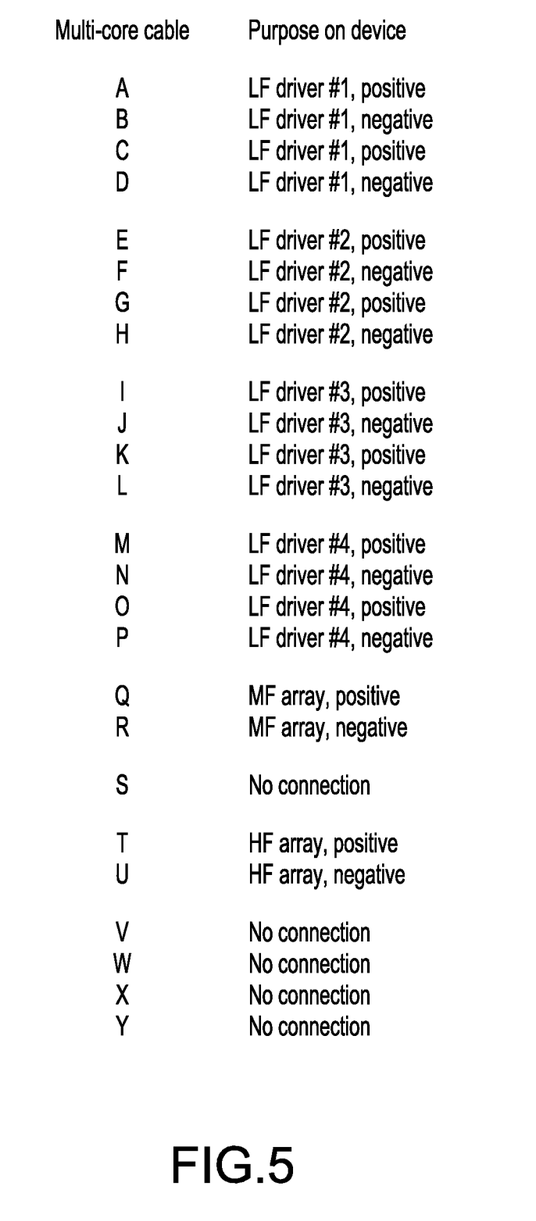
FIG. 5 depicts a first table in accordance with certain embodiments of the modular acoustic system illustrating a multi-core cable connection between acoustic device 180 and amplification and power distribution device 150.
Figure 6:
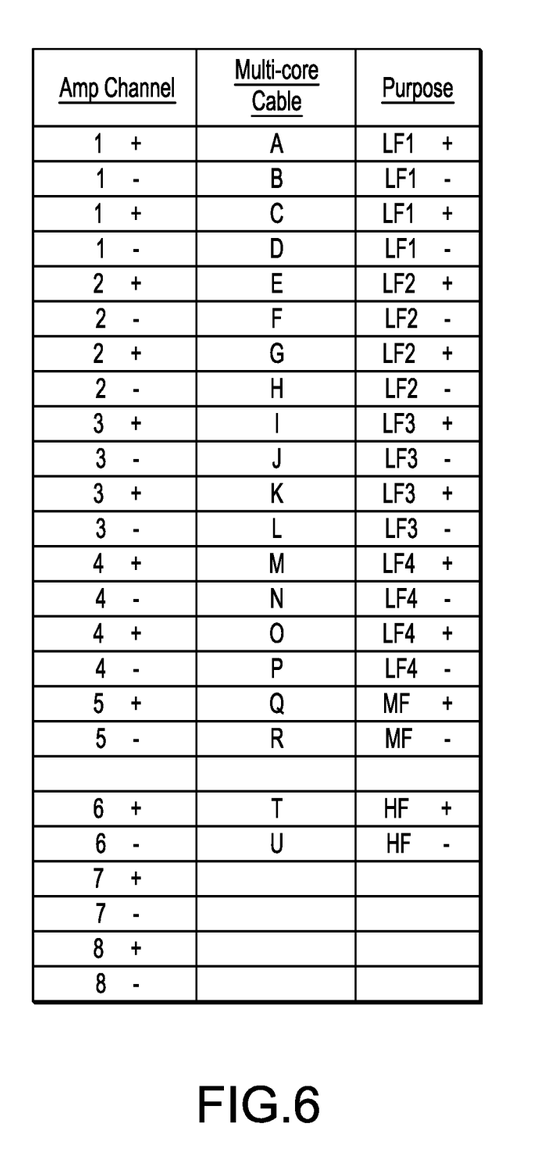
FIG. 6 depicts a second table in accordance with certain embodiments of the modular acoustic system illustrating a multi-core cable connection between acoustic device 180 and amplification and power distribution device 150.

In one embodiment of the invention according to FIGS. 3B and 5-6, connection point 192 on housing 182 of acoustic device 180 is connected to a speaker connection panel on amplification and power distribution device 150 by a single multi-core speaker cable 105a with a large multi-pin connector (Speaker Cable, 24N40 with LKA32/25R). However, any alternative type of multi-pin connector can be used to establish the connection. In an alternative embodiment in which multiple acoustic devices 180 are used in modular acoustic system 100, each acoustic device 180 is separately connected to the speaker connection panel on amplification and power distribution device 150 using its own multi-core speaker cable 105a. However, it shall be appreciated that alternative arrangements of acoustic devices 180 and amplification and power distribution device 150 are possible. In one embodiment of the invention, a single amplifier 152 can be used to power multiple multi-core speaker cables 105a and corresponding acoustic devices 180. As a result, multiple acoustic devices 180 can be connected together and fed from a single amplifier 152.

The speaker connection panel on amplification and power distribution device 150 comprises a receptacle for the LKA32 connector on the cable. Following the panel connection, wiring for each speaker cable extends internally to connection points on a corresponding amplifier 152 of amplification and power distribution device 150. In one embodiment, internal patching is performed inside the speaker connection panel, so that 12 conductors (6 amp channels with a + conductor and a − conductor each) of transducer power required from each amplifier 152 are wired across a greater number of copper conductors available inside the speaker cable. This allows some of the transducers inside acoustic device 180 to be powered by four conductors (two parallel positive conductors, two parallel negative conductors), thus increasing the cable gauge and power handling capabilities of each transducer wired in this manner. It shall be appreciated that other embodiments of the invention can include different variations of this wiring method.

In one embodiment of the invention as depicted in FIG. 1, drive system 130 is operably connected to amplification and power distribution device 150 via network 110. Drive system 130 serves as a controller of modular acoustic system 100 during an operation that performs acoustic testing of an object. In one embodiment of the invention, drive system 130 comprises main controller 132, test control computer 134 and acoustic controller 136 operably connected together by connection links 107.

During an operation of modular acoustic system 100, drive system 130 is configured to transmit noise signals through an established connection via network 110 using an audio over IP protocol (AoIP) such as Audinate's Dante protocol (Dante) or other suitable protocol, to each amplifier 152 of amplification and power distribution device 150. However in alternative embodiments, it shall be appreciated that other types of signal transmission can be used other than network-based signal transmission. In one embodiment of the invention, an Ethernet connection for facilitating the transmission of these noise signals is established between drive system 130 and amplification and power distribution device 150 by use of any number of Link LKG (LKG 24/2E20, LK2CAT6F AD6) connectors. The Link LKG connector is advantageous in that it combines the connection of Ethernet cables, analog audio signal cables and digital audio signal cables in a single connector. Ethernet cables used in the system are enclosed in a multi-core signal cable.

In one embodiment of the invention in which multiple amplification and power distribution devices 150 are used in modular acoustic system 100, the plurality of amplification and power distribution devices 150 are connected together by daisy chaining LKG connectors between amplification and power distribution devices 150 starting first with drive system 130. Each amplification and power distribution device 150 has its own mains power connections as needed, and mains power can also be daisy chained between amplification and power distribution devices 150 depending on the application.

In one embodiment of the invention, drive system 130 contains a panel connector that the LKG connector mates to, connecting drive system 130 to the first amplification and power distribution device 150 in the system. Main controller 132 of drive system 130 comprises a DirectOut Prodigy.MP audio signal processor, which acts as an interface between test control computer 134 and components of modular acoustic system 100. The Prodigy.MP audio signal processor processes drive noise signals from test control computer 134, and allows for routing of the signals as needed to Dante network outputs (also on the Prodigy.MP) and out the physical Ethernet connections that travel to the LKG connector to the one or more amplification and power distribution devices 150. In an alternative embodiment, redundant backup capabilities for the Dante network signal and Prodigy.MP processor can be supplied. As such, the system has the capability to provide dual-redundant network connections, network switches, dual-mirrored redundant processors, and battery UPS devices. It shall be appreciated that any number and type of processors can be used in drive system 130 to implement the above-described functions as desired.

It shall be appreciated that drive system 130 and test control computer 134 comprise any number of storage devices and/or hardware components necessary for storing any variety of computer algorithms that are executable by any number of processors and/or computing components, in order to implement the functionality of modular acoustic system 100.

In certain embodiments of the invention, modular acoustic system 100 can be arranged in various configurations to perform acoustic testing of the object. In one embodiment, a small setup of modular acoustic system 100 comprises one drive system 130, one amplification and power distribution device 150 and six acoustic devices 180 connected together to achieve an acoustic output of approximately 147 dB. In an alternative embodiment, a medium setup of modular acoustic system 100 comprises one drive system 130, two amplification and power distribution devices 150 and twelve acoustic devices 180 connected together to achieve an acoustic output of approximately 150 dB. In an alternative embodiment, a large setup of modular acoustic system 100 comprises one drive system 130, four amplification and power distribution devices 150 and twenty-four acoustic devices 180 connected together to achieve an acoustic output of approximately greater than 150 dB. In an alternative embodiment, a very large setup of modular acoustic system 100 comprises one drive system 130, ten amplification and power distribution devices 150 and sixty acoustic devices 180 connected together to achieve an acoustic output of approximately greater than 150 dB. However, it shall be appreciated that any alternative number of drive systems 130, amplification and power distribution devices 150 and acoustic devices 180 can be connected together to achieve the desired acoustic output.

Figure 7A:
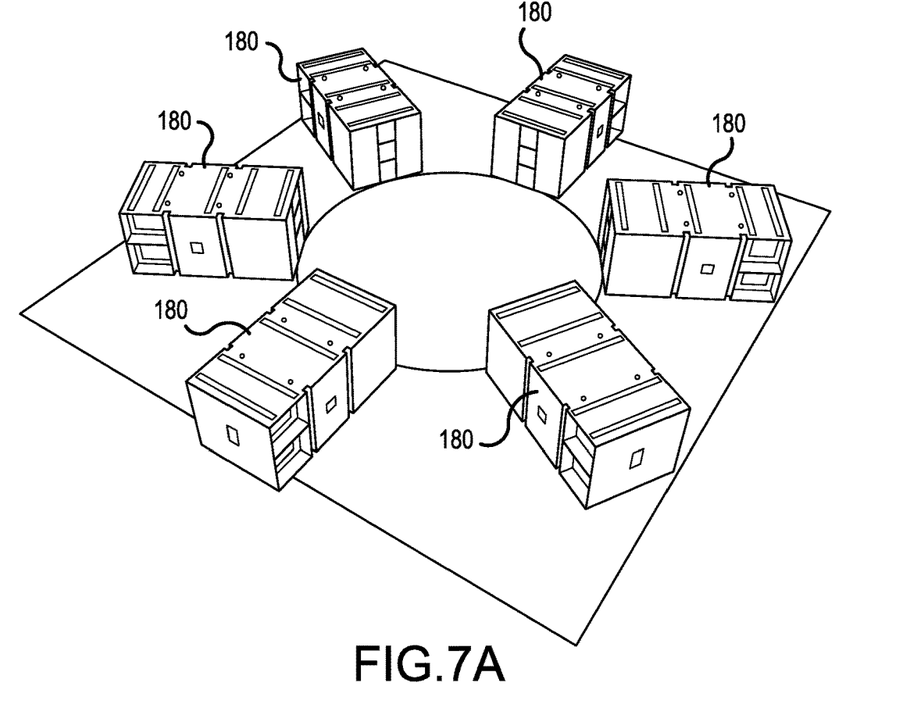
FIG. 7A depicts a perspective view of certain embodiments of the modular acoustic system illustrating a first exemplary arrangement of acoustic devices 180.
Figure 7B:
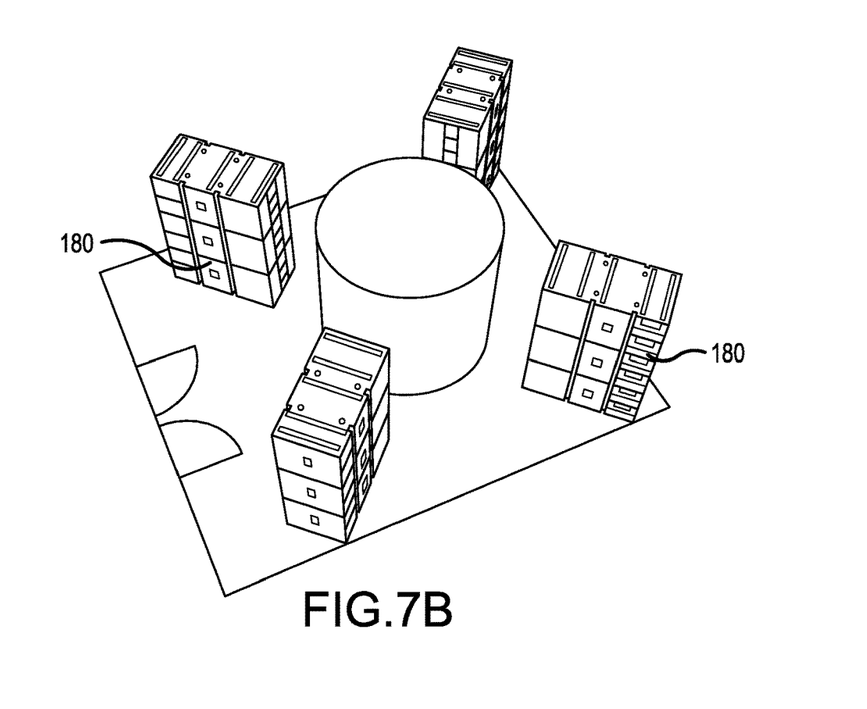
FIG. 7B depicts a perspective view of certain embodiments of the modular acoustic system illustrating a second exemplary arrangement of acoustic devices 180.
Figure 7C:
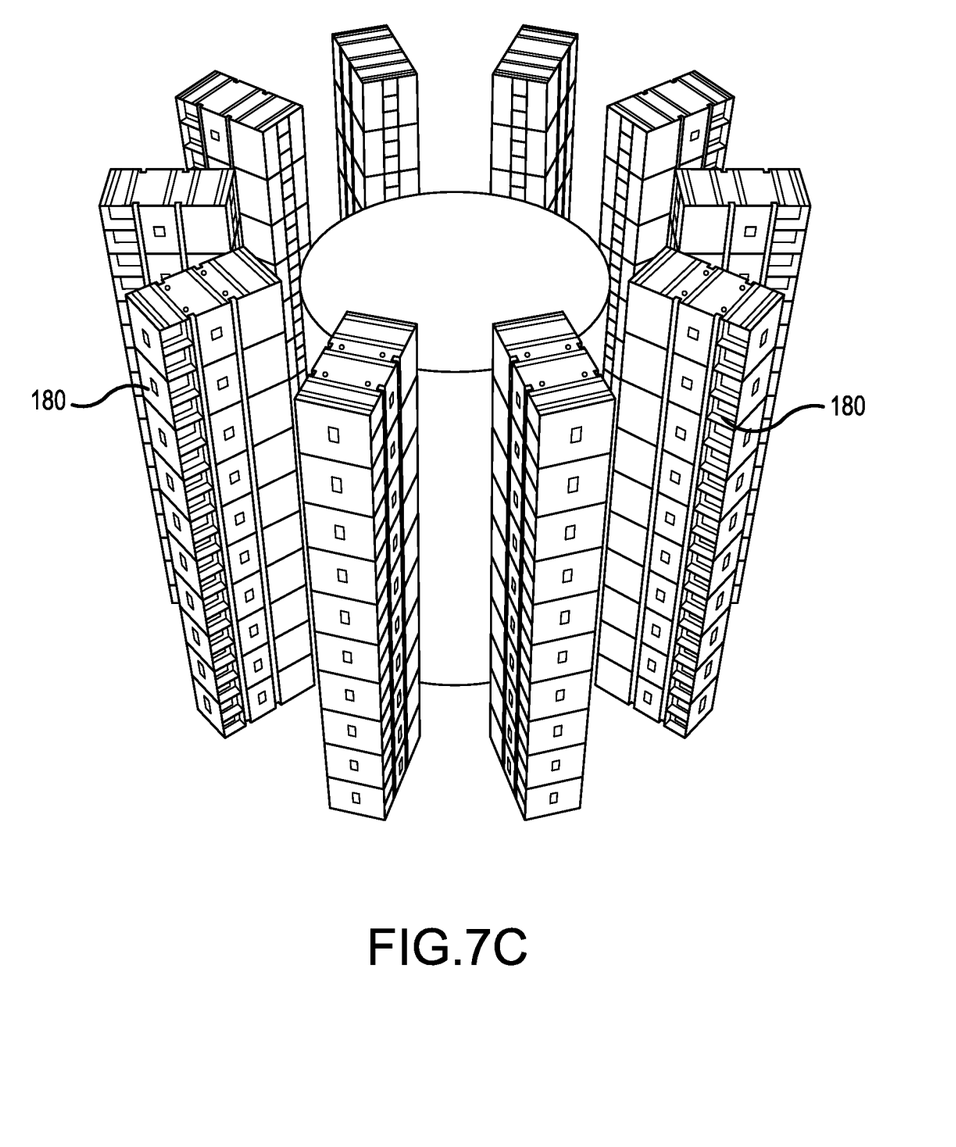
FIG. 7C depicts a perspective view of certain embodiments of the modular acoustic system illustrating a third exemplary arrangement of acoustic devices 180.

In the various arrangements of modular acoustic system 100 as depicted in FIGS. 7A-7C, acoustic devices 180 are generally oriented/stacked in a circular pattern around the object to be tested (e.g., small satellite or missile) with open gaps between acoustic devices 180. The circular pattern of acoustic devices 180 in this configuration is beneficial for contributing to the uniformity of the acoustic field generated by modular acoustic system 100.

Figure 8A:
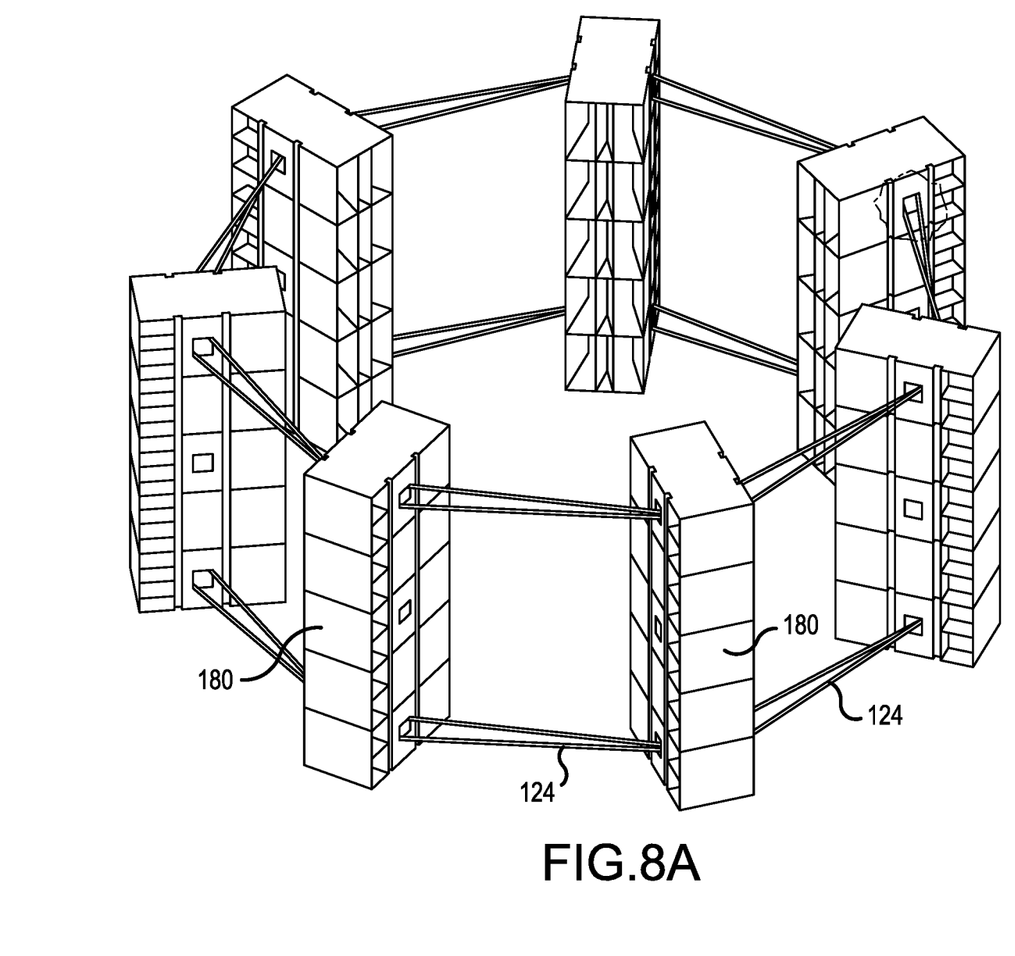
FIG. 8A depicts a perspective view of an embodiment of the modular acoustic system illustrating the securement of acoustic devices 180 with braces 124.
Figure 8B:
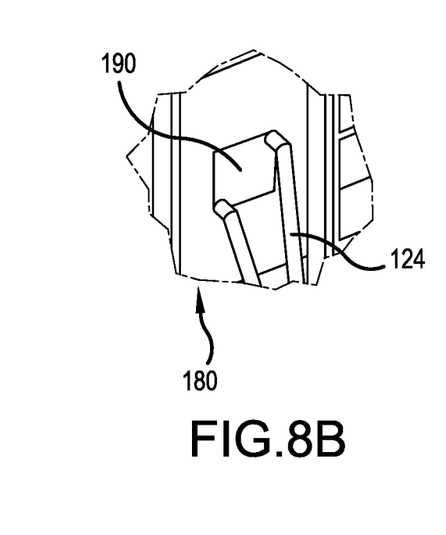
FIG. 8B depicts a perspective view of an embodiment of the modular acoustic system illustrating a connection between braces 124 and acoustic device 180.
Figure 9:
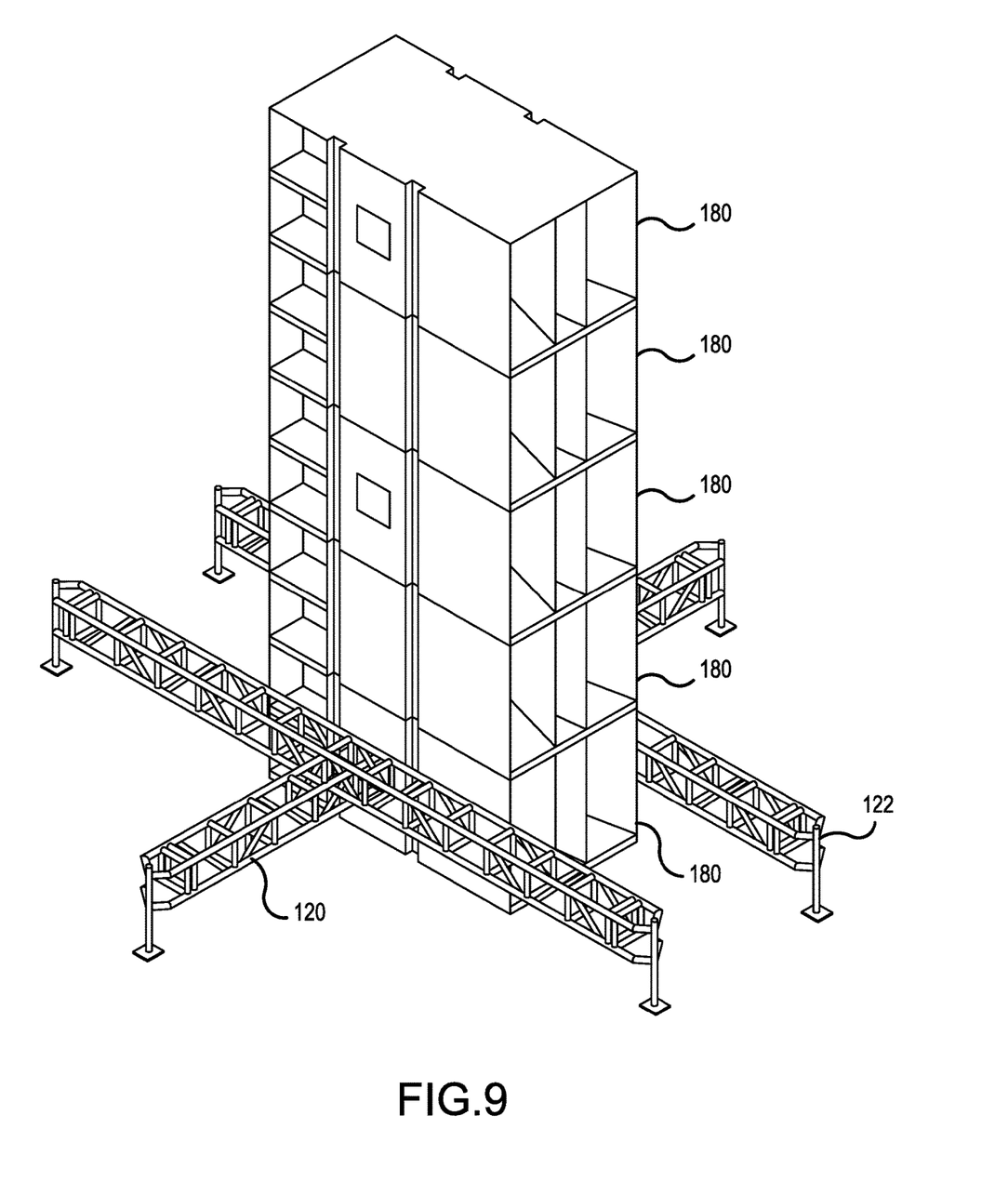
FIG. 9 depicts a perspective view of certain embodiments of the modular acoustic system illustrating a setup of acoustic devices 180 supported by truss 120.

It shall be appreciated that any support structures and connectors such as trusses, outrigger blocks, braces, cables and the like, can be used to secure acoustic devices 180 in place. In one embodiment of the invention as depicted in FIGS. 8A-8B, a bracing system can be used to secure different stacks of acoustic devices 180 together during an installation. In this embodiment, braces 124 can be connected to attachment points 190 of a pair of acoustic devices 180 in adjacent stacks. As a result, a plurality of acoustic devices 180 can be stacked and supported by any number of braces 124 as needed. In one embodiment of the invention as depicted in FIG. 9, a plurality of acoustic devices 180 can be stacked and supported by any number of trusses 120 and outrigger blocks 122.

In embodiments of the invention, modular acoustic system 100 performs acoustic testing of an object with the following exemplary steps. During the operation of modular acoustic system 100, a control system of test control computer 134 facilitates the processing and control of multiple random noise signals, shaped with equalization to the tonal balance of the user's specification. Each of these drive noise signals is transmitted to the DirectOut Prodigy.MP audio signal processor of main controller 132, which allows for routing of the signals as needed through the Dante Audio over IP Network (e.g., network 110) to one or more amplification and power distribution devices 150 connected in modular acoustic system 100.

As the drive noise signals travel over the Dante Audio over IP Network, each drive signal is patched digitally from the Dante Network to feed the input of each amplifier 152 of one or more amplification and power distribution devices 150. Inside each amplifier 152, the full-range random noise signal is broken down into different bandpasses and each of these specific frequency ranges are fed to each output channel of amplifier 152, determined by which bandpass in acoustic device 180 is wired to the particular amplifier channel. Different standards can be used with respect to how the bandpasses are ordered inside amplifiers 152 and directly connected to the one or more acoustic devices 180, to ensure standard operation across all systems.

Each amplifier 152 transmits a high voltage/current signal corresponding to the noise signal via multi-core speaker cable 105a to a corresponding acoustic device 180. This enables the transducers of acoustic device 180 to convert the high voltage/current signal into acoustic waves 270, which are directed to the object to be tested.

During this operation, test control computer 134 associated with drive system 130 forms a closed loop system with acoustic controller 136 (having m+p international VibRunner Computer+I/O Hardware) with acoustic testing capabilities, which generate the drive noise signals to perform the acoustic test according to the user's specifications. The drive noise signals are transmitted to the corresponding one or more connected amplification and power distribution devices 150 to enable one or more connected acoustic devices 180 to generate acoustic waves that are directed to the object to be tested.

In one embodiment of the invention, acoustic controller 136 (having m+p international VibRunner hardware with DF-ACS direct field acoustic control software) provides the drive noise signals to perform the acoustic test, which is controlled by test control computer 134. The level of drive noise signals is predetermined by an input of an operator corresponding to specific acoustic level targets for each ⅓ octave band that is to be tested, which form an acoustic reference spectrum. It shall be appreciated that other target levels and frequency bands can be entered and controlled by the system as needed.

In view of the foregoing, drive system 130 acts as a management hub that routes the drive noise signals over the Audio over IP Network to the one or more amplification and power distribution devices 150. Drive system 130 also allows modular acoustic system 100 to be monitored in real-time, to ensure that the system does not reach or surpass any mechanical or electrical limits during performance of the acoustic testing of the object. In one embodiment of the invention, each amplification and power distribution device 150 accommodates the amplification, signal routing and power distribution needs for up to six acoustic devices 180. The one or more acoustic devices 180 are oriented as desired to output acoustic waves 270 to perform acoustic testing of the object.

During acoustic testing of the object, the plurality of microphones 112a capture the outputted acoustic waves 270 from acoustic devices 180 in real-time, and transmit data associated with the captured acoustic waves to test control computer 134. After receiving the data from microphones 112a, test control computer 134 performs a continuous octave-based analysis in the time domain and automatically adjust the levels of each ⅓ octave band being tested, to ensure the output of modular acoustic system 100 matches the target reference spectrum. In addition, test control computer 134 subsequently makes one or more decisions based on the acoustic wave data to adjust certain frequencies corresponding to the drive noise signals. These adjusted drive noise signals are transmitted to the connected one or more amplification and power distribution devices 150 and one or more acoustic devices 180.

As a result, modular acoustic system 100 is configured to perform adjustments in real-time of the drive noise signals and acoustic waves 270 generated by acoustic devices 180, based on the acoustic wave data captured by microphones 112a. This allows modular acoustic system 100 to maintain the user's specified acoustic output and response during a test of the object. It shall be appreciated that modular acoustic system 100 has the ability to run single or multiple drive signals, in a variety of patching and routing configurations, with these drive signals either coherent, coupled, incoherent, decoupled or bandpassed, and/or in any combination of the above.

It shall be appreciated that modular acoustic system 100 as described in embodiments of the invention comprises numerous advantages including an acoustic testing solution with enhanced acoustic efficiency (at least a 10%-15% improvement over prior art acoustic systems), increased acoustic capabilities that allow an operation across a wider power band, reduced number of components required to complete an acoustic testing setup, and reduced assembly time.

In addition, MF/HF horn assembly 200 is advantageous because it provides a significant increase in overall sound pressure level (SPL) output from acoustic device 180. Notably, MF/HF horn assembly 200 is designed to place each of the MF transducers and HF transducers on their own respective acoustic horns, with each horn extremely well-optimized and tuned to provide the maximum possible acoustic performance for each respective bandpass. The overall design of MF/HF horn assembly 200 offers the best possible integration of these optimized acoustic horns together, so as to maintain the exceptional acoustic performance of each bandpass before the bandpasses are combined together to form a single acoustic output signature of acoustic device 180. In one embodiment of the invention, MF/HF horn assembly 200 is reinforced to provide exceptional rigidity, highly predictable directivity, and industry leading acoustic output.

It shall be appreciated that modular acoustic system 100 can be used in a variety of applications. For example, modular acoustic system 100 may be used in various configurations to support the augmentation of existing reverberant chamber facilities, or serve as their replacements.

In this embodiment, modular acoustic system 100 has numerous benefits in the following scenarios: (1) a user has an existing reverberant chamber, and a quantity of acoustic devices are utilized in conjunction with the user's existing sound generating equipment to meet a certain sound pressure level or frequency response goal; (2) a user has an existing reverberant chamber, and a quantity of acoustic devices are utilized to replace the existing sound generating equipment in the chamber, by loading the acoustic devices into the existing horn openings in the facility, placing the acoustic devices in the space in an array, or implementing other configurations in which the acoustic devices are used to replace the sound generating equipment; and (3) a user builds a new acoustic-friendly facility that is reverberant-chamber-like, and utilizes acoustic devices to create the acoustic excitation within the facility.

In other embodiments of the invention, it shall be appreciated that modular acoustic system 100 may be beneficial for use in other applications including, but not limited to, Hyperloop and aircraft applications.

It shall be appreciated that the components of modular acoustic system 100 described in several embodiments herein may comprise any known materials in the field and be of any color, size and/or dimensions. In addition, alternative types of wires, cables and/or connectors may be used to connect the components of modular acoustic system 100 together in alternate embodiments of the invention. It shall be appreciated that the components of modular acoustic system 100 described herein may be manufactured and assembled using any known techniques in the field.

Persons of ordinary skill in the art may appreciate that numerous design configurations may be possible to enjoy the functional benefits of the inventive systems. Thus, given the wide variety of configurations and arrangements of embodiments of the present invention, the scope of the invention is reflected by the breadth of the claims below rather than narrowed by the embodiments described above.

What is claimed is:

1. A modular acoustic system for use to perform acoustic testing on an object across an entire audible spectrum with enhanced efficiency and acoustic capabilities, the acoustic system configured to perform adjustments in real-time on a plurality of acoustic waves directed at the object, the acoustic system comprising:

an acoustic device comprising a housing to store a horn assembly with a plurality of transducers configured to generate the plurality of acoustic waves;

an amplification and power distribution device comprising an amplifier electrically coupled to the horn assembly of the acoustic device; and a controller operably connected to the amplification and power distribution device, the controller configured to transmit a plurality of noise signals over a network to the amplifier of the amplification and power distribution device to enable the plurality of transducers of the acoustic device to generate the plurality of acoustic waves, wherein the controller is configured to adjust the plurality of noise signals transmitted to the amplifier of the amplification and power distribution device based on the plurality of acoustic waves generated by the acoustic device, and the plurality of transducers of the acoustic device is configured to generate the plurality of acoustic waves across the entire audible spectrum to perform acoustic testing on the object.

2. The modular acoustic system of claim 1, wherein the amplifier of the amplification and power distribution device transmits the plurality of noise signals directly to the plurality of transducers of the acoustic device.

3. The modular acoustic system of claim 1, wherein the controller comprises an acoustic controller configured to provide the plurality of noise signals transmitted over the network, and perform a continuous octave-based analysis with respect to the plurality of noise signals in a time domain according to ⅓ octave band targets.

4. The modular acoustic system of claim 1, wherein the plurality of acoustic waves generated by the plurality of transducers of the acoustic device comprises low frequency acoustic waves, medium frequency acoustic waves and high frequency acoustic waves that are combined in-phase to form a plurality of unified acoustic waves.

5. The modular acoustic system of claim 4, wherein the horn assembly comprises:

a low frequency horn disposed in the housing of the acoustic device and comprising a plurality of low frequency transducers corresponding to a first set of transducers in the plurality of transducers of the acoustic device, the plurality of low frequency transducers being coupled to a low frequency horn wall; and a medium frequency horn mounted to a high frequency horn in which the medium frequency and high frequency horns are coupled to a mouth of the low frequency horn wall of the low frequency horn, wherein the medium frequency horn comprises a plurality of medium frequency transducers corresponding to a second set of transducers in the plurality of transducers of the acoustic device, the plurality of medium frequency transducers being coupled to a medium frequency horn wall, and the high frequency horn comprises a plurality of high frequency transducers corresponding to a third set of transducers in the plurality of transducers of the acoustic device, the plurality of high frequency transducers being coupled to a high frequency horn wall.

6. The modular acoustic system of claim 5, wherein the plurality of low frequency transducers of the low frequency horn generates the low frequency acoustic waves based on the plurality of noise signals from the amplifier, the plurality of medium frequency transducers of the medium frequency horn generates the medium frequency acoustic waves based on the plurality of noise signals from the amplifier, and the plurality of high frequency transducers of the high frequency horn generates the high frequency acoustic waves based on the plurality of noise signals from the amplifier.

7. The modular acoustic system of claim 5, further comprising a plurality of heat sink panels coupled to the housing of the acoustic device and the plurality of low frequency transducers of the low frequency horn.

* * * * *